United States Patent [19]

Downing

[11] Patent Number: 4,919,251

[45] Date of Patent: Apr. 24, 1990

[54] CONVEYOR ESCAPEMENT

[76] Inventor: Leon A. Downing, 3011 Oak Hill Road, Peninsula, Ohio 44264

[21] Appl. No.: 279,828

[22] Filed: Dec. 5, 1988

[51] Int. Cl.$^5$ ............................................ B65G 37/00
[52] U.S. Cl. .................................. 198/463.6; 198/530
[58] Field of Search ............... 198/463.6, 468.2, 468.3, 198/468.9, 530; 209/531, 532

[56] References Cited

U.S. PATENT DOCUMENTS

| | | |
|---|---|---|
| 1,138,193 | 7/1921 | Hinchman . |
| 1,508,369 | 9/1924 | Johnson . |
| 2,606,657 | 8/1952 | Berthelsen ...................... 209/531 X |
| 2,835,372 | 5/1958 | Biddison ...................... 198/463.6 X |
| 2,930,345 | 3/1960 | Jacobsen et al. ........................ 113/2 |
| 4,044,891 | 8/1977 | Pynsky .................................. 209/73 |
| 4,646,909 | 3/1987 | vom Stein ........................... 198/460 |
| 4,705,158 | 11/1987 | Sirvet ................................. 198/463.4 |
| 4,735,302 | 4/1988 | Marchetti ......................... 198/463.4 |

FOREIGN PATENT DOCUMENTS

| | | | |
|---|---|---|---|
| 0307922 | 1/1969 | Sweden ........................... 198/463.6 |
| 0839920 | 6/1981 | U.S.S.R. ........................... 198/463.6 |
| 1371848 | 2/1988 | U.S.S.R. ........................... 198/463.6 |

Primary Examiner—Robert J. Spar
Assistant Examiner—James R. Bidwell
Attorney, Agent, or Firm—Renner, Kenner, Greive, Bobak, Taylor & Weber

[57] ABSTRACT

An apparatus for controlling the travel of articles along a conveyor track. The apparatus includes a frame (14) positioned relative to the conveyor track (11), and having a downstream end and an upstream end. A first pair of gates (20) extends from the downstream end of the frame (14) into the travel path of the article. The first pair of gates (20) rotates synchronously between a closed position and an open position. A second pair of gates (21) extends from the upstream end of the frame (14) into the travel path of the article. The second pair of gates (21) likewise rotates synchronously between an open position and a closed position. A drive train, including sprockets (30, 31, 36 and 42) and chain (43) simultaneously rotates the first pair (20) and the second pair (21) of gates so that when one of the pairs of gates is in a closed position the other of the pairs of gates is in an open position.

6 Claims, 4 Drawing Sheets

CONVEYOR ESCAPEMENT

TECHNICAL FIELD

The present invention relates generally to conveyor systems. More particularly, the present invention relates to a sequencer or escapement device for a conveyor. Specifically, the present invention relates to an escapement device which is capable of handling articles of various sizes, such as tires, on the same conveyor. Furthermore, the escapement device of the present invention forcefully discharges articles passing downstream on the conveyor.

BACKGROUND ART

Escapement devices, or sequencers as they may be termed, are used with conveyor systems to control the travel of articles along the conveyor. Many times, the escapement device is employed to permit the passage of an article along the conveyor when a downstream station is prepared to receive the article. Escapement devices also are employed to control the spacing between successive articles along the conveyor. Such spacing may be required to accommodate subsequent processing steps downstream on the conveyor; or to otherwise regulate the timing sequence of the articles, as when meshing with other conveyor flows.

Escapement devices known in the art have significant limitations. Many are specifically manufactured to handle articles of one size, or with very little size variation. Generally, these types of escapement devices employ star wheels or turnstiles to positively engage the articles and discharge them downstream on the conveyor.

Other escapement devices employ one or more movable barriers or gates which selectively are positioned within the path of the articles on the conveyor. Such gates may be interposed from above, below or at the side of the conveyor. These gates generally are suitable to block articles of various sizes on the conveyor. However, they do not serve forcefully to eject an article downstream. Rather, the movement of the conveyor belt, or the force of gravity on inclined roller conveyors, must be relied upon to move the article.

Due to slippage between the article and the conveyor belt, or the effect of friction in the conveyor rollers, the acceleration of the article from its stopped position upstream of the gate may vary significantly from article to article. As a result, it is quite difficult to obtain uniform spacing of articles along the conveyor, which may then jeopardize downstream operations. Furthermore, the articles may become stuck in the path of the gate, causing a restriction which ultimately may lead to a shutdown of the conveyor line.

Despite the various escapement devices known in the art, none is available which is capable of handling articles of varying sizes at the same time, for example, handling a plurality of articles where some might be up to twice the size of others, while at the same time providing forced discharge of the articles from the escapement device to ensure appropriate spacing of the articles. Moreover, no device is available which is capable of handling tires ranging in size from approximately 22 inches (55.9 cm) to approximately 36 inches (91.4 cm) at the same time.

DISCLOSURE OF THE INVENTION

It is, therefore, an object of the present invention to provide a conveyor escapement device which is capable of operation with articles of various sizes at the same time.

It is another object of the present invention to provide a conveyor escapement device, as above, usable with various types of conveyor systems including powered belt conveyors and gravity roller conveyors.

It is a further object of the present invention to provide a conveyor escapement device, as above, which forcefully discharges articles downstream on the conveyor.

It is still another object of the present invention to provide a conveyor escapement device, as above, which ensures accurate spacing of articles along the conveyor.

It is yet a further object of the present invention to provide a conveyor escapement device, as above, which moves articles therethrough with minimal risk of jamming by the articles.

These and other objects of the present invention, as well as the advantages thereof over existing and prior art forms, which will be apparent in view of the following specification, are accomplished by means hereinafter described and claimed.

In general, an apparatus for controlling the travel of articles along a conveyor track includes a frame positioned relative to the conveyor track. The frame has a downstream end and an upstream end. A first pair of gates extends from the downstream end of the frame into the travel path of the articles. The gates of the first pair are rotatable synchronously between a closed position and an open position. A second pair of gates extends from the upstream end of the frame into the travel path of the article. Likewise, the gates of the second pair are rotatable synchronously between an open position and a closed position. A drive is provided to simultaneously rotate the first pair and the second pair of gates so that when one pair is in an open position, the other pair is in a closed position.

A preferred, exemplary embodiment of a conveyor escapement device incorporating the concept of the present invention is shown by way of example in the accompanying drawings, without attempting to show all the various forms and modifications in which the invention might be embodied, the invention being measured by the appended claims and not by the details of the specification.

PREFERRED EMBODIMENT FOR CARRYING OUT THE INVENTION

Figure 1:
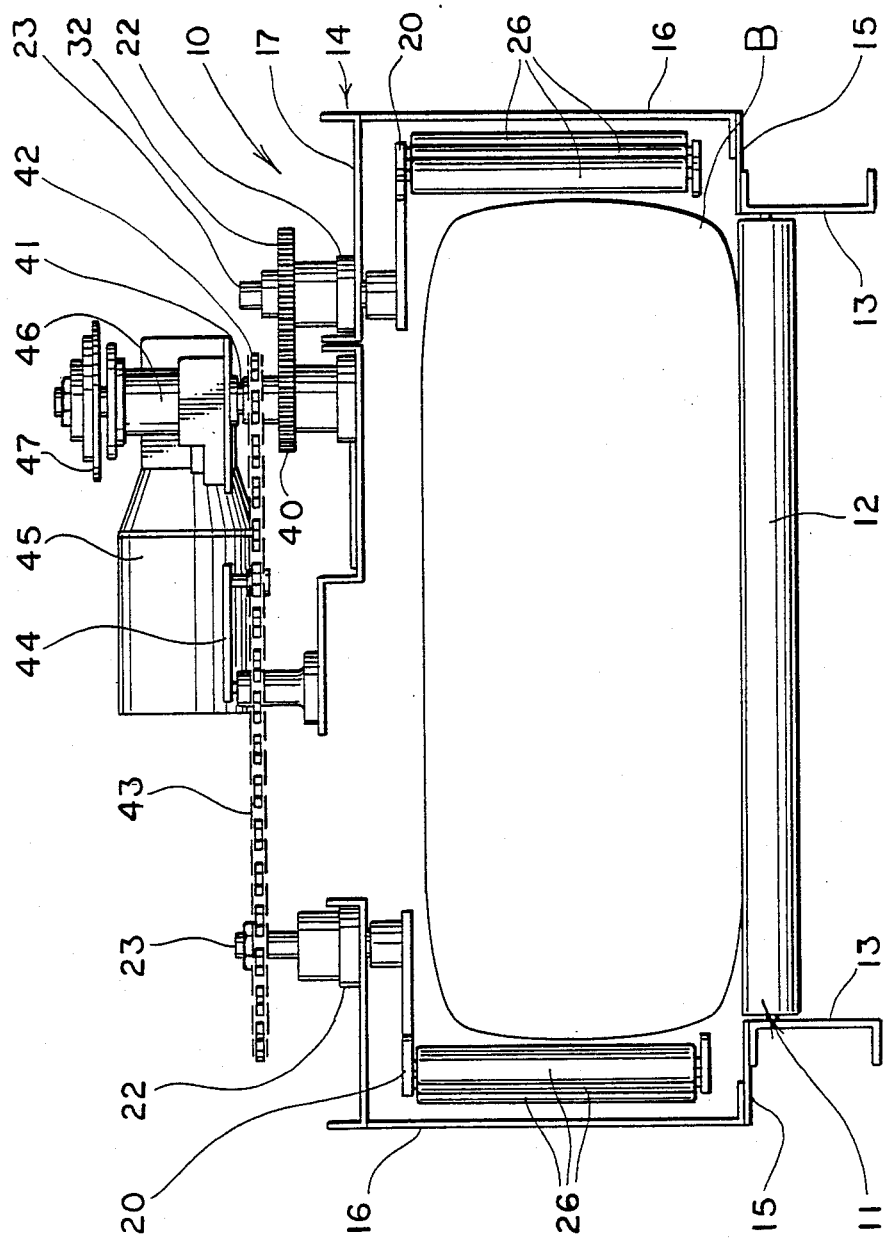
FIG. 1 is a front elevational view of an escapement device embodying the concept of the present invention.

An escapement device, according to the concept of the present invention, is indicated generally by the numeral 10 in FIG. 1. Escapement device 10 is depicted in cooperation with a typical gravity conveyor, indicated generally by the numeral 11, of the type used for transporting items such as tires. Such a conveyor 11 includes conveyor rollers 12 extending laterally between longitudinal side rails 13. While the escapement device 10 is described herein in conjunction with a gravity conveyor, it should be understood that other conveyors, including those having driven belts or tracks, or driven roller conveyors, may equally be served thereby.

The escapement device 10, itself, includes a box-like frame indicated generally by the numeral 14 and positioned above conveyor 11 and secured to side rails 13 as by support plates 15. Frame 14 includes upstanding side supports 16 defining the side walls of frame 14. A top plate 17 is secured to the upper ends of side supports 16. The specific size of frame 14 may vary depending upon the specific application. It should be appreciated, however, that frame 14 should be suitably scaled to permit articles to pass freely through the escapement device 10 on conveyor 11.

Figure 2:
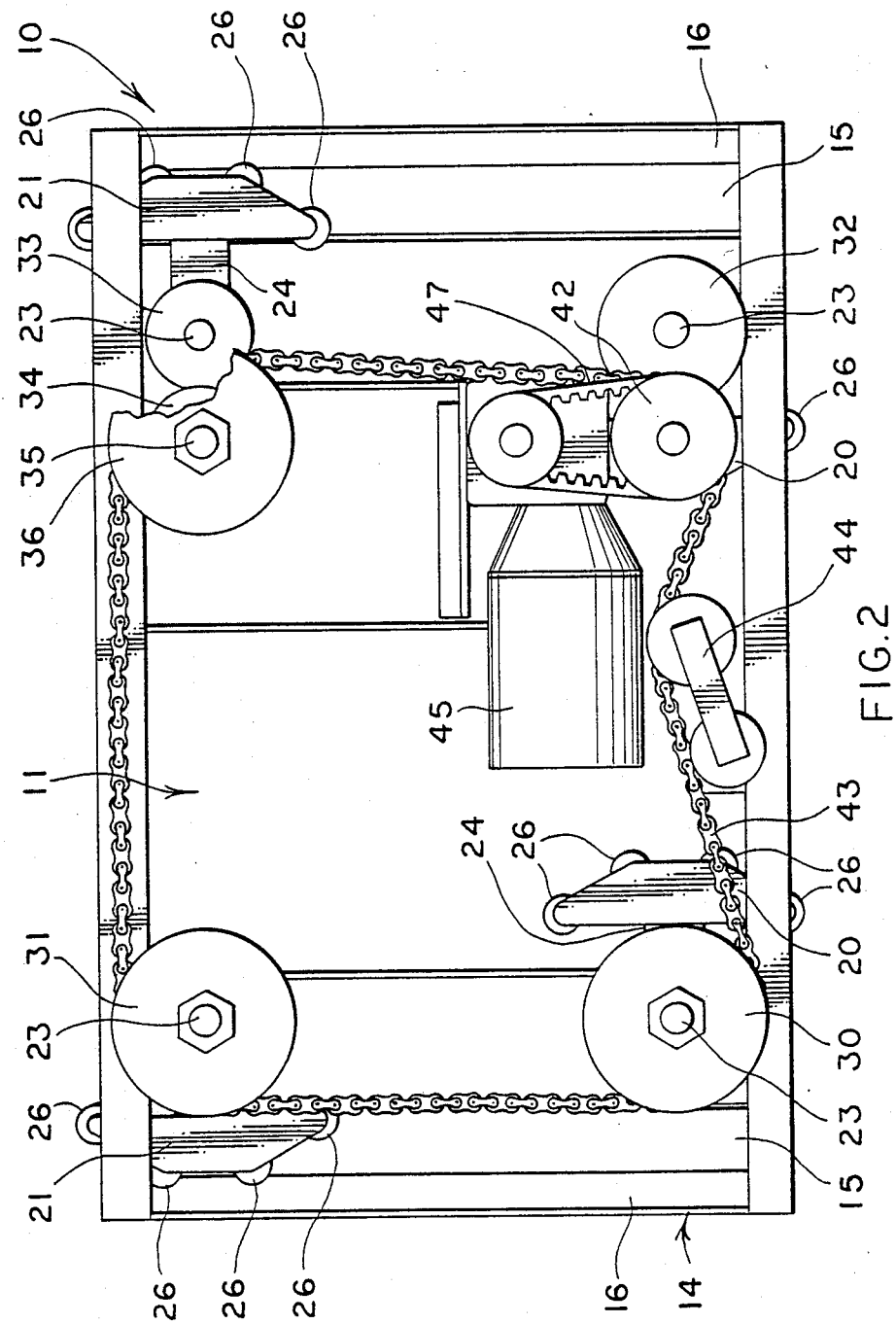
FIG. 2 is a top plan view of the escapement device of FIG. 1.

A pair of downstream gates 20 and a pair of upstream gates 21 are rotatably fixed to top plate 17 as by bearings 22 and depend downward into the travel path of articles on conveyor 11. As depicted in FIG. 1, downstream gates 20 are depicted in an outward, or open position, while upstream gates 21 are depicted in an inward, or closed position. As will be discussed hereinbelow, downstream gates 20 and upstream gates 21 are oriented to always be in opposite phases so that when one set of gates is allowing a tire to pass, the other set is blocking and/or pushing a tire. As will also be appreciated hereinbelow, the escapement device 10 is depicted in FIG. 1 at the midpoint of an escapement cycle for ease of description. Reference to FIG. 2 should be made to consider the orientation of downstream gates 20 and upstream gates 21 at the beginning and/or end of an escapement cycle.

Figure 3:
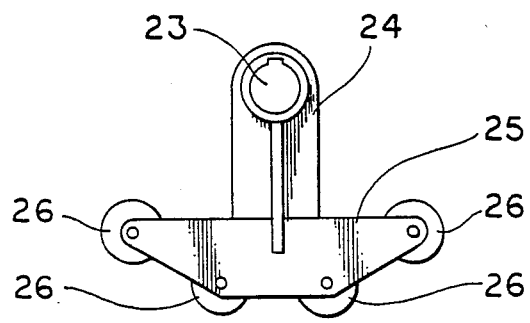
FIG. 3 is a top plan view of a gate of the escapement device of FIG. 1.
Figure 4:
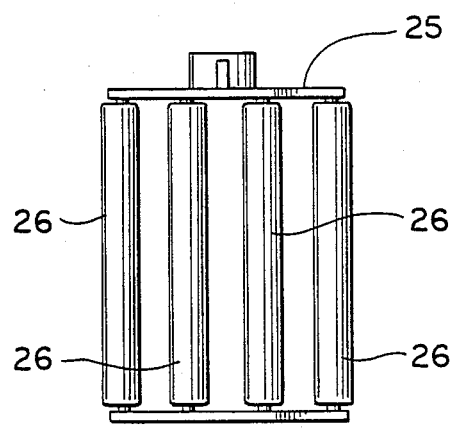
FIG. 4 is an elevation of the gate of the escapement device of FIG. 1.

Downstream gates 20 and upstream gates 21 are structurally identical. Reference is made to FIGS. 3 and 4 depicting a typical gate, for example a downstream gate 20, to consider the structure thereof. Specifically, gate 20 includes a shaft 23 which may be rotatably received by bearing 22 as discussed hereinabove. A swing plate 24 is secured to the lower end of shaft 23 and extends radially outward therefrom. A roller support plate 25 is secured tangentially to swing plate 24 and provides support for a plurality of gate rollers 26, as for example four rollers, which descend downward a sufficient distance to define a barrier to articles on conveyor 11. It should be appreciated that swing plate 24 and support plate 25 are configured suitably to be positioned for rotation in a substantially horizontal plane about the axis of shaft 23, in close proximity to the underside of top plate 17. The combined radial length of swing plate 24 and support plate 25 may vary depending on the specific application; but it should be such that when secured to frame 11, rollers 26 may be positioned in close proximity to sides of frame 11 to permit free travel of articles on conveyor yet be capable of defining a suitable barrier when rollers 26 are positioned in the travel path of the articles, as will become more apparent hereinbelow.

Rollers 26 are preferred as they reduce frictional contact with articles on the conveyor. Accordingly, gate 20 may be swung with minimal effort, even while an article is being held in position. In addition, articles passing through the escapement device are less likely to become stuck should they inadvertently contact gate 20. While rollers 26 are preferred, other suitable barrier means, such as rigid pipes or beams, or combinations thereof, may be employed. Furthermore, the number of rollers 26 employed may vary. More or less rollers 26, or other suitable barrier means, may be used as necessary to provide an effective barrier.

It also will be noted, with reference to FIG. 3, that rollers 26 preferably are located in an arcuate fashion on roller support plate 25. The radius, about the axis of shaft 23, of the arc along which rollers 26 are positioned may be determined in relation to the desired location of rollers 26 in the article path when gate 20 is in a closed position. The arcuate orientation of rollers 26, again, facilitate rotation of gate 20 as it allows a uniform moment arm about shaft 23, particularly when gate 20 is in contact with an article.

Referring again to FIGS. 1 and 2, the drive train of the escapement device 10, can be considered. Specifically, downstream gates 20 operate in opposing synchronization; that is, one gate rotates clockwise while the other rotates counterclockwise. Simultaneously, upstream gates 21 also operate in opposing synchronization. As discussed hereinabove, however, downstream gates 20 are out of phase with upstream gates 21, that is, when downstream gates 20 are closed, upstream gates 21 are open, and vice versa. While it is preferable that gates 20 be approximately 180° out of phase with gates 21, a device could readily be designed to operate in a range of plus or minus 15° of 180° and still be well within the spirit of this invention.

This synchronized motion is achieved through a roller chain and gear drive train. Specifically, one gate of the downstream pair of gates 20 carries a chain sprocket 30 at the upper end of its shaft 23. In identical fashion, one of the upstream pair of gates 21 also carries a chain sprocket 31 on the upper end of its shaft 23. The other gate of the downstream pair of gates 20 and the upstream pair of gates 21 each have a spur gear 32 and 33, respectively, secured to their respective shafts 23.

Spur gear 33 of upstream gate 21 mates with a like spur gear 34 carried on a rotatable intermediary shaft 35 on which is also carried a chain sprocket 36. In a similar fashion, spur gear 32 of downstream gate 20 mates with a like spur gear 40 carried on a rotatable drive shaft 41. A chain sprocket 42 likewise is secured to drive shaft 41 for rotation therewith.

Chain sprockets 30, 31, 36 and 42 are suitably sized and aligned to be interconnected with a roller chain 43. An idler chain tensioner 44 may be employed to maintain proper tension of chain 43 in a conventional manner. Thus interconnected chain sprockets 30, 31, 36 and 42, and their associated shafts all will rotate in unison.

A gear motor 45, or similar prime mover, is coupled to drive shaft 41 to effect rotation thereof. While gear motor 45 may be coupled directly to drive shaft 41, it is more preferred to employ a suitable clutch 46 to control operation of the escapement device 10 more effectively. One type of clutch 46 which has been found to be quite suitable is a Warner Wrap Spring Clutch, Model CB, provided by Warner Electric, PSI Division, Pitman, N.J. Such a clutch 46 includes an electrically operated solenoid which controls engagement and disengagement.

The output collar of clutch 46 is coupled to drive shaft 41 and the input collar is interconnected to gear motor 45 as by a suitable chain and sprocket 47. Of course, alternative couplings can be employed at either the input and/or output collars of clutch 46 to provide efficient power transmission. It should be appreciated that by using a solenoid actuated clutch 46, gear motor 45 can be energized to run at a constant speed and the escapement device 10 can readily be cycled merely by engaging clutch 46.

It may be beneficial in understanding the present invention to consider the operation thereof in conjunction with a conveyor line. Specifically, along with FIGS. 1 and 2, reference is made to FIGS. 5A through E, inclusive, which depicts schematically a typical escapement cycle of the present invention. The particular cycle depicted is for an escapement device 10 suitable for handling automotive tires of various sizes as may normally be encountered in a typical manufacturing facility.

FIGS. 5A through E, inclusive, depict the relationship of a small tire A and a large tire B relative to the escapement device 10 positioned on a typical gravity conveyor 11. A second conveyor 50 is positioned at the downstream end of the escapement device 10 and oriented with a direction of travel substantially perpendicular to the direction of travel of gravity conveyor 11. As is generally the case, second conveyor 50 may be a powered conveyor to receive tires from several gravity conveyors and to transport them to other locations in the manufacturing facility.

Figure 5:
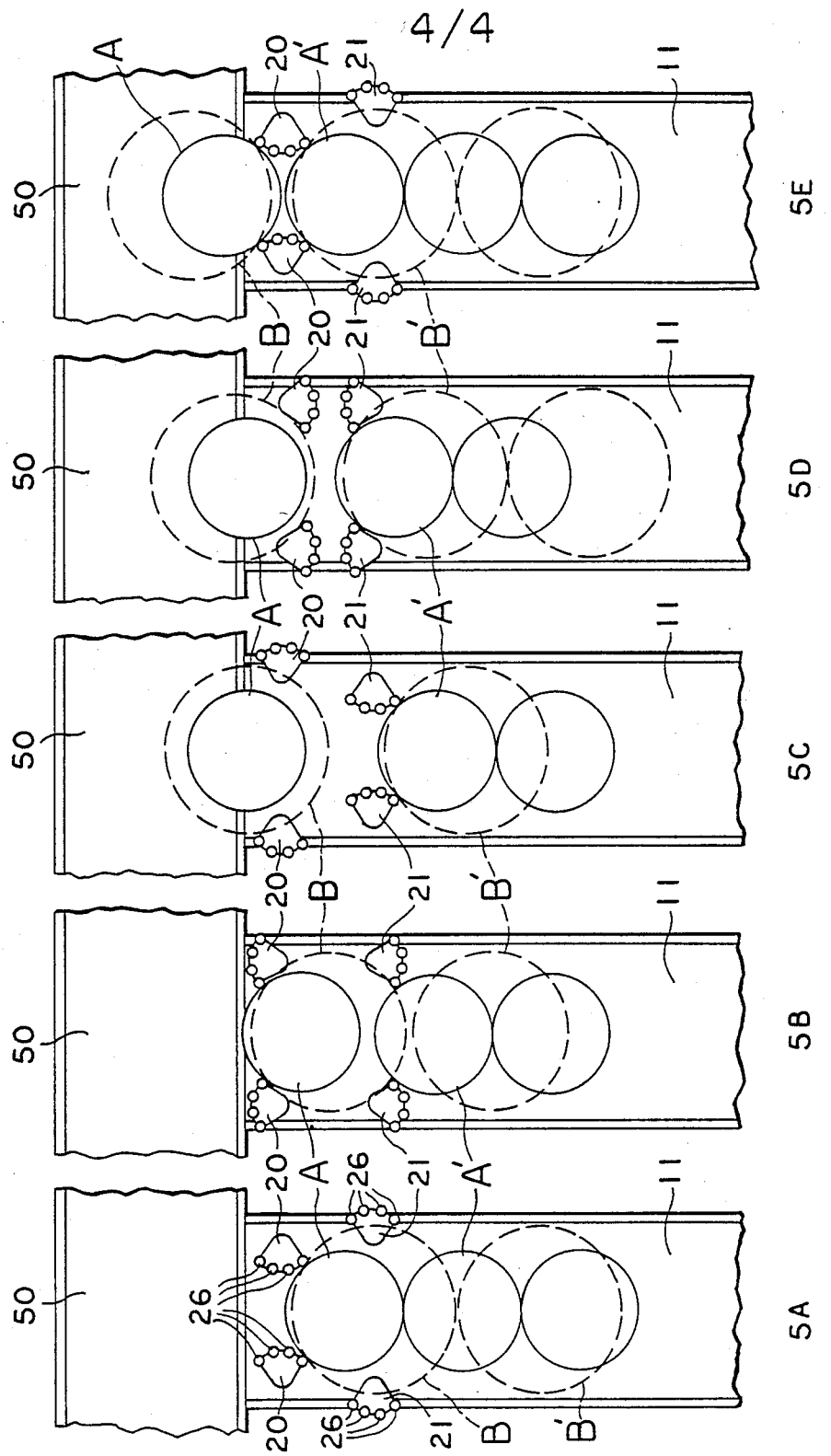
FIGS. 5A-E, inclusive, are schematic plan views depicting the sequential operation of the escapement device of FIG. 1.

At the initial stage, FIG. 5A, the escapement device 10 is oriented with downstream gates 20 closed and upstream gates 21 open. Lead tires, A or B, travel down conveyor 11 and are stopped by the rollers 26 of closed downstream gates 20. Subsequent tires, A' or B', likewise stop upon contacting the preceding tire.

When it is desired to release a tire from the escapement device, clutch 46 may be engaged, to begin manipulation of the escapement cycle. Downstream gates 20 and upstream gates 21 rotate, as heretofore described, such that downstream gates 20 begin to swing open in a downstream direction, as depicted in FIG. 5B, which is one-quarter of the way through the escapement cycle. At this same time, upstream gates 21 begin to close by rotating to engage the next proceeding tire, A' or B', with its rollers 26. In addition, rollers 26 of upstream gates 21 also may engage the upstream end of tire, A or B, presently within the escapement device 10 and, thereby, begin moving it downstream.

FIG. 5C depicts the escapement device 10 at the midpoint of the escapement cycle, as may also be seen in FIG. 1. The tire, A or B, within the escapement device 10, is moving freely past downstream gates 20, which are now fully open; the tire having been assisted by upstream gates 21, which are now fully closed and halting movement of the subsequent tires, A' or B'.

As the escapement cycle continues, downstream gates 20 continue to rotate, returning to a closed position. As downstream gates 20 close, the rollers 26 thereof again engage the upstream end of the tire, A or B, and continue to urge it in a downstream direction, as depicted in FIG. 5D which depicts the escapement device 10 three-quarters of the way through the cycle. At this same time, upstream gates 21 also continue to rotate to an open position, thereby allowing the next advancing tire, A' or B', to enter the escapement device 10. This tire, A' or B', does not pass completely through the escapement device 10 as its progress is halted by downstream gates 20 which are now partially closed.

As the escapement cycle continues to the final stage, which is the initial stage of the next cycle, as depicted at FIG. 5E, downstream gates 20 are fully closed to halt movement of the subsequent tires, A' or B'. The first tire, A or B, at this time, has passed through the escapement device 10 to be received by the second conveyor 50. This has been a critical point with other types of escapement devices because, generally, the tire lacked sufficient momentum to carry it far enough onto the second conveyor 50 to be received thereby. The result was that the tires became stuck partially on gravity conveyor 11 and partially on second conveyor 50.

With the present invention, this problem is remedied. To begin with, the forward momentum of the tire, A or B, generated when upstream gates 21 and downstream gates 20 each engage the tire, A or B, successively, serves to propel the tire out onto the second conveyor. Furthermore, as depicted in FIG. 5E, downstream gates 20 preferably are located relative to second conveyor 50 such that, at the end of the cycle, the escaped tire, A or B, is positioned such that the great majority of its mass is placed onto second conveyor 50. In this fashion, the tire positively is deposited well onto second conveyor 50 such that it may be carried therealong without delay.

The escapement device 10 is thus ready for another cycle. It should be appreciated that cycling of the device 10 may be accomplished manually by activating and deactivating the solenoid in clutch 46 to engage or disengage clutch 46 as desired. Operation also may be automated, or partially automated, by using suitable sensors and controllers, as would be known to one skilled in the art. For example, a suitable sensor may be employed with clutch 46 such that it is automatically controlled with only one tire escaping per cycle.

It should be appreciated that while the foregoing description was directed to an escapement device 10 for a tire conveyor system, the invention is not so limited. Indeed, the concept of the present invention is equally applicable to other conveyor systems, gravity or powered, handling different types of articles, round or otherwise. It also should be appreciated that the present invention is able to handle articles of varying sizes traveling on the conveyor, and positively to discharge such articles from the escapement device thereby minimizing the risk of jam in the conveyor operation.

Thus, it should be evident that an escapement device according to the concept of the invention disclosed herein carries out the various objects of the invention and otherwise constitutes an advantageous contribution to the art.

I claim:

1. Apparatus for controlling the travel of articles along a conveyor track, comprising frame means positioned relative to the conveyor track, and having a downstream end and an upstream end; a first pair of gate means extending from said downstream end of said frame means into the travel path of the articles, said first pair of gate means being rotatable synchronously between a closed position and an open position; a second pair of gate means extending from said upstream end of said frame means into the travel path of the article, said second pair of gate means being rotatable synchronously between an open position and a closed position; said gate means including swing plate means rotatable about an axis substantially normal to the travel path of the articles and support plate means secured to the radiaslly distal end of said swing plate means and movable in a plane substantially parallel to the travel path of the articles; rollers depending from said support plate means substantially lateral to the travel path of the articles and movable by said swing plate means selectively into the travel path of the asrticles, said rollers being positioned on said support plate means substantially accurately about said axis of rotation of said swing plate means; and drive means simultaneously to rotate said first pair and said second pair of gate means so that when one of said pairs of gate means is in the closed position the other of said pair of gate means is in an open position.

2. Apparatus according to claim 1, wherein each said gate means includes a shaft to which it is fixed for rotation therewith; said drive means include means to mechanically interconnect each said shaft for simultaneous rotation and motor means operatively connected with said means to mechanically interconnect.

3. Apparatus according to claim 2, wherein said means to mechanically interconnect includes a first sprocket on said shaft of one of said gate means of said first pair of gate means, first intermediary shaft means mechanically interconnected with said shaft of the other of said gate means of said first pair of gate means, a second sprocket on said first intermediary shaft means, and chain drive means mechanically interconnecting said first sprocket with second sprocket and said motor means.

4. Apparatus according to claim 3, wherein said means to interconnect further includes a third sprocket on said shaft of one of said gate means of said second pair of gate means, second intermediary shaft means mechanically interconnected with said shaft of said other of said gate means of said second pair of gate means; and a fourth sprocket on said second intermediary shaft means, said chain drive means further mechanically interconnecting said third and fourth sprockets with said second sprocket and said motor means.

5. Apparatus according to claim 4 further comprising clutch means selectively coupling said motor means with said first intermediary shaft means.

6. Apparatus according to claim 1 wherein said first pair of gate means is oriented approximately 180° out of phase relative to said second pair of gate means.

* * * * *